United States Patent [19]

Lee et al.

[11] 4,162,243
[45] Jul. 24, 1979

[54] HIGH STRENGTH, EXTRUDABLE SILICONE ELASTOMER COMPOSITIONS

[75] Inventors: Chi-Long Lee, Midland; Myron T. Maxson, Sanford; Leo F. Stebleton, Midland, all of Mich.

[73] Assignee: Dow Corning Corporation, Midland, Mich.

[21] Appl. No.: 904,176

[22] Filed: May 8, 1978

[51] Int. Cl.$^2$ .............................................. C08L 83/04
[52] U.S. Cl. .................................. 260/37 SB; 528/31
[58] Field of Search ..................................... 260/37 SB

[56] References Cited

U.S. PATENT DOCUMENTS

| | | | |
|---|---|---|---|
| 3,122,516 | 2/1964 | Polmanteer | 260/37 SB |
| 3,671,480 | 6/1972 | Wada et al. | 260/37 SB |
| 3,697,473 | 10/1972 | Polmanteer et al. | 260/37 SB |
| 3,884,866 | 5/1975 | Jeram et al. | 260/37 SB |
| 4,032,502 | 6/1977 | Lee et al. | 260/37 SB |

*Primary Examiner*—Lewis T. Jacobs
*Attorney, Agent, or Firm*—Roger H. Borrousch

[57] ABSTRACT

A composition curable to a silicone elastomer is prepared by mixing a triorganosiloxy endblocked polydimethylsiloxane fluid where the triorganosiloxy is dimethylvinylsiloxy or methylphenylvinylsiloxy, a reinforcing silica having a surface treated organosiloxane groups which contain 0.05 to 0.32 percent by weight vinyl, a fluid organohydrogensiloxane, a platinum catalyst and optionally a platinum catalyst inhibitor. The polydimethylsiloxane fluid has a major peak molecular weight of 68,000 to 135,000, a dispersity index greater than 3.8, the lowest molecular weight species between 854 and 3146 and the highest molecular weight species between 174,000 and 370,000. These compositions are readily extrudable under low pressure and cure to high strength elastomers with a high durometer.

21 Claims, No Drawings

HIGH STRENGTH, EXTRUDABLE SILICONE ELASTOMER COMPOSITIONS

BACKGROUND OF THE INVENTION

1. Field of the Invention

This invention relates to a silicone elastomer composition which is extrudable and which cures to a high strength, high durometer silicone elastomer.

2. Description of the Prior Art

Silicone elastomers can be made from many different polyorganosiloxanes, cure mechanisms and fillers. These silicone elastomers have been made from stiff gum polymers, as well as, water thin fluids. The curing mechanisms have ranged from organic peroxides to moisture sensitive means to radiation. A variety of fillers have also been used, such as reinforcing silica fillers to extending fillers. One unique silicone elastomeric composition can be prepared from a vinyl-containing polydiorganosiloxane, an organohydrogensilicon crosslinker, a platinum catalyst and optionally fillers. These compositions are desirable for many reasons, such as curable without leaving groups, can be cured either at room temperature or at elevated temperature, can be stabilized at room temperature for storage by a platinum catalyst inhibitor and can be made from either high viscosity or low viscosity polymers. Although these compositions are very useful and many commercial products are available, there are still some combinations of properties yet to be discovered. The present invention provides one such composition which has a useful combination of properties both in the uncured state and in the cured state. It is desirable to have readily extrudable compositions which can be extruded and molded at low pressure and be cured to elastomers with high strength and high durometer in relatively short periods of time to be practical commercially.

An organic peroxide, heat cured, organosiloxne composition is disclosed by Polmanteer in U.S. Pat. No. 3,122,516, which has improved hot strength. The hot strength, according to Polmanteer, is a synergistic effect obtained when reinforcing silica contains a specific range of vinyl substituted silyl units attached through siloxane linkages to a specific portion of the silicon atoms in the surface of the silica substrate and these vinyl substituted silyl units are present within the specified proportions. The modified silica filler defined by Polmanteer is described as containing 50 to 100 mol percent $SiO_2$ units (W) and 0 to 50 mol percent $RSiO_{1.5}$ units (X) which are particles having

units (Y) and

units (Z) where there are 4 to 29.9 (Y) units and 0.1 to 2 (Z) units per 100 (W) and (X) units and a total of 6 to 30 (Y) and (Z) units per 100 (W) and (X) units. The rubber stocks described by Polmanteer permit vinyl in the organopolysiloxane and suggests that the best results are obtained using polymers having 99 to 99.95 inclusive mol percent dimethylsiloxane units and 0.05 to 1 inclusive mol percent methylvinylsiloxane units. Polmanteer teaches that from 20 to 100 parts of filler per 100 parts of polysiloxane gum must be used to achieve the improved hot strength, where the viscosity of the polymer and the desired amount of filler are in an inverse ratio to each other. However, Polmanteer does not suggest a composition of this invention which is a readily extrudable composition that cures to a high strength, high durometer elastomer wherein the composition requires a unique combination of a specific vinylsiloxane polymer, a specific vinylsiloxane treated silica, an organohydrogensiloxane crosslinker and a platinum catalyst.

In U.S. Pat. No. 3,671,480, Wada et al. describe a heat curable elastomeric silicone composition comprising a mixture of two polydiorganosiloxanes, each of which contains vinyl unsaturation, a silica filler, a polyorganohydrogensiloxane and a platinum compound. The compositions described by Wada et al. are stated to cure to high tear strength, flame retardant, heat resistant elastomers with superior compression set. These compositions are not readily extrudable but require pressing into shape under substantial pressure and then cured.

Polmanteer et al. in U.S. Pat. No. 3,697,473 describe a composition which is fluid and consists essentially of a polydiorganosiloxane having two vinyl radicals per molecule and being terminated with triorganosiloxy group, a mixture of silicon compounds containing silicon-bonded hydrogen atoms, one compound containing two silicon-bonded hydrogen atoms per molecule and another compound containing 3 to 10 silicon-bonded hydrogen atoms per molecule and cured with a platinum catalyst, optionally a reinforcing silica. Although these compositions described by Polmanteer et al. are fluid, the cured elastomers have low modulus and a low durometer with high tensile strengths and elongations. Such compositions may be useful for many applications, but do not obtain the high durometers along with the high tear strengths and tensile strengths which are required in other applications.

In U.S. Pat. No. 3,884,866, Jeram et al. describe an organopolysiloxane composition which is stated as suited for low pressure injection molding and which is stated as having high tensile strength, good elongation and high tear. These compositions described by Jeram et al. comprise 20 to 90 parts of a vinyl-containing high viscosity organopolysiloxane having a viscosity of 5,000 to 1,000,000 centipoise, 5 to 40 parts of a low viscosity vinyl-containing organopolysiloxane having a viscosity of 50 to 5,000 centipoise, 5 to 70 parts of filler and 0.1 to 50 parts per million of a platinum catalyst. This composition is cured by mixing 100 parts of it with 1 to 100 parts of a hydrogen silicone composition. These Jeram et al. compositions appear to suffer the same problems encountered with other prior art compositions. Jeram et al. teach that using small amounts of a treated silica filler, low durometer elastomers are obtained and increasing the amount of silica filler increases the durometer as well as the viscosity of the composition.

As can be seen by these prior art teachings, the adjustment of a composition to obtain one desired property results in the loss of another property. The result is that the desired property is achieved with a compromise of the other properties and sometimes all the properties are compromised.

SUMMARY OF THE INVENTION

The silicone elastomeric compositions of this invention maintain their readily extrudable characteristic while through a synergistic reaction between a certain triorganosiloxy endblocked polydimethylsiloxane fluid which contains vinyl in the triorganosiloxy units and a certain reinforcing amorphous silica having vinyl-containing organosiloxane groups bonded to its surface cure to elastomers with high tensile strengths, high durometer and high tear strengths. It was unexpected that the molecular weight distribution of the fluid combined with certain silica-containing vinyl radicals on its surface could provide elastomers of high tensile strengths, high tear strength and high durometer without increasing the viscosity of the composition to a point which would make it impractical to use these compositions for low pressure injection molding processes. Compositions of this invention are obtained by mixing the triorganosiloxy endblocked polydimethylsiloxane fluid, the reinforcing amorphous silica, an organohydrogensiloxane, and a platinum catalyst, optionally a platinum catalyst inhibitor.

DESCRIPTION OF THE INVENTION

This invention relates to a silicone elastomeric composition consisting essentially of a product obtained by mixing (A) 100 parts by weight of a triorganosiloxy endblocked polydimethylsiloxane fluid in which the triorganosiloxy units are selected from the group consisting of dimethylvinylsiloxy and methylphenylvinylsiloxy, said fluid being a mixture of polymeric species of varying molecular weight where each species is present in an amount sufficient to collectively provide a molecular weight distribution such that there is present at least one polymeric species (1) at a concentration greater than the concentrations of adjacent polymeric species of lower and higher molecular weight where polymeric species (1) is identified as a peak molecular weight as determined by gel permeation chromatographic analysis and there being a peak molecular weight of polymeric species in the range of from 68,000 to 135,000 at a major concentration, in said fluid the molecular weight of the lowest molecular weight polymeric species being in the range of from 854 to 3146 and the molecular weight of the highest molecular weight species being in the range of from 174,000 to 370,000, the mixture of polymeric species having a molecular weight distribution such that a dispersity index has a value greater than 3.8, (B) from 20 to 60 parts by weight of a reinforcing amorphous silica having a surface area of greater than 100 square meters per gram, the surface of the silica having silicon atoms to which are bonded organosiloxane groups selected from the group consisting of (a) $(CH_3)_3SiO-$,
(b) $CH_2=CH(CH_3)_2SiO\{(CH_3)_2SiO\}_x-$,
(c) $CH_2=CH(CH_3)(C_6H_5)SiO\{(CH_3)_2SiO\}_x-$, and (d)
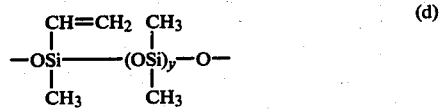

in which x is an integer of 0 to 20 and y is an integer of 1 to 5, the organosiloxane groups being present in an amount such that there is from 0.05 to 0.32 percent by weight vinyl based on the weight of the silica and the organosiloxane groups being present in a mole ratio such that there is from 7 to 50 moles of (a) for each mole of (b), (c), (d) or mixture thereof, (C) an amount of a fluid organohydrogensiloxane sufficient to provide from 1 to 3 inclusive silicon-bonded hydrogen atoms per vinyl radical in (A) and (B) combined, said organohydrogensiloxane having an average of at least three silicon-bonded hydrogen atoms per molecule and consisting essentially of units selected from a group consisting of methylhydrogensiloxane, dimethylsiloxane, dimethylhydrogensiloxy, trimethylsiloxy and $SiO_2$ units, and (D) an amount of a platinum catalyst sufficient to provide at least one part by weight platinum per one million parts by weight of (A), said platinum catalyst being soluble in (A), the silicone elastomer composition having a viscosity such that at least 45 grams per minute of the composition can be extruded through a 3.175 millimeter orifice under a pressure of 620 kilopascals.

The triorganosiloxy endblocked polydimethylsiloxane fluid of (A) is a type of polydiorganosiloxane which is well known in the art. For the purpose of this invention, the triorganosiloxy units can be dimethylvinylsiloxy or methylphenylvinylsiloxy. Although the fluid is described as polydimethylsiloxane, it would be expected that small amounts of other diorganosiloxane units or monorganosiloxane units without substantially altering the character of the fluid can be used. For convenience, the triorganosiloxy endblocked polydimethylsiloxane will be referred to as "fluid (A)".

Fluid (A) is a mixture of polymeric species of varying molecular weight. Each polymeric species of a certain molecular weight is present in a certain concentration and contributes to the final character of fluid (A). Collectively the total number of species provide a molecular weight distribution which is fluid (A). The distribution of polymeric species is in accordance to the concentration of each polymeric species of a certain molecular weight. In fluid (A), there is present at least one polymeric species (1) at a concentration greater than the concentration of adjacent polymeric species of lower and higher molecular weight. Polymeric species (1) can be identified as a peak molecular weight, PM, as determined by gel permeation chromatographic analysis. Fluid (A) has a PM in the range of 68,000 to 135,000 which is at a major concentration. However, not all triorganosiloxy endblocked polydimethylsiloxanes are suitable for fluid (A) of this invention. Fluid (A) also requires a dispersity index, DI, of greater than 3.8. DI is an indicator relating the concentrations of all the species and is the weight average molecular weight divided by the number average molecular weight. In fluid (A), the lowest molecular weight polymeric species is in the range of 854 and 3146 and the highest molecular weight polymeric species is in the range of 174,000 to 370,000. Fluid (A) can have more than one PM, such as two or three, as long as the DI and the other parameters remain within the above defined limits. One preferred embodiment is a composition which is prepared from fluid (A) in which there are two PM, a major PM in the range of 68,000 to 135,000 and a minor PM in the range of 4,000 to 24,100. Major PM refers to the PM having the greatest concentration and the minor PM refers to a lesser concentration. Preferred fluid (A) is one having a PM in the range of 80,000 to 120,000 at a major concentration and a DI in the range of 6 to 12. Another preferred fluid (A) is one having two PM, a major PM in the range of 80,000 to 120,000, a minor PM in the range of 7,000 to 15,000 and a DI in the range of 6 to 12.

Conventional, well-known methods of polymerization for the preparation of polydimethylsiloxanes do not automatically provide fluid (A). Fluid (A) can be obtained by blending various fluid polydimethylsiloxanes to obtain the proper DI, PM and molecular weight limits. For example, two fluids with different PM but with each having a DI less than 3.8 can be blended to provide a PM within the defined limits for fluid (A) and a DI of greater than 3.8.

Another method of preparing fluid (A) is described by Lee in U.S. Pat. No. 3,445,426 which is hereby incorporated by reference to show a method of preparing suitable polydimethylsiloxane. Briefly, the method produces a monodispersed hydroxyl endblocked polydimethylsiloxane which can be reacted with a hexaorganodisilazane, triorganochlorosilane, or triorgano(N-methylacetamido)silane. Such monodispersed polydimethylsiloxanes can be blended to produce fluid (A). Also disclosed in Lee is a method of making a fluid having two PM. In this method, polymerization is started and allowed to proceed for a determined time, then more ingredients are added and the polymerization is allowed to continue whereby a fluid (A) can be produced having a major PM and a minor PM.

The reinforcing amorphous silica of (B) is based on the well-known silicas which are commercially available and which have a surface area of at least 100 square meters per gram, preferably 120 to 600 square meters per gram. The reinforcing amorphous silica have surface with silicon atoms to which are bonded organosiloxane groups. The organosiloxane groups bonded to the silica surface of this invention can be (a) $(CH_3)_3SiO-$,
(b) $CH_2=CH(CH_3)_2SiO\{(CH_3)_2SiO\}_x-$,
(c) $CH_2=CH(CH_3)(C_6H_5)SiO\{(CH_3)_2SiO\}_x-$, and

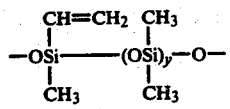

(d)

in which x is an integer of 0 to 20 and y is an integer of 1 to 5. The organosiloxane groups are present on the silica in an amount sufficient to provide from 0.05 to 0.32 percent by weight vinyl radical based on the weight of the silica, and are present in a mole ratio such that there is from 7 to 50 moles of organosiloxane group (a) for each mole of organosiloxane group (b), (c), (d) or mixtures thereof. The organosiloxane groups on the silica are preferably a combination of (a) and (b) which x is 0 to 5 or a combination of (a) and (d). Preferred is a silica having bonded to the surface trimethylsiloxy groups and dimethylvinylsiloxy groups in a mole ratio of 20 to 1 respectively. Also preferred is a silica having bonded to its surface trimethylsiloxy groups and (d) in a mole ratio of 10 to 1 respectively. The reinforcing amorphous silica having organosiloxane groups bonded to its surface are present in amount of 20 to 60 parts by weight based on 100 parts by weight of fluid (A), preferably 35 to 45 parts by weight. The reinforcing amorphous silica includes fume silica and precipitated silica.

The silicas of (B) can be prepared by treating the silica with organosiloxane compounds and thereafter mixing the treated silica with the other ingredients or the silicas of (B) can be prepared in the presence of fluid (A), an in situ method. Such methods of treating silica are broadly known in the art, and are applicable in this invention to prepare the treated silicas if the proper organosiloxane groups are used as defined herein. The treating compounds can include hexamethyldisilazane for (a) organosiloxane groups, symmetrical-tetramethyldivinyldisilazane and

for (b) organosiloxane groups, symmetrical-dimethyldiphenyldivinyldisilazane for (c) organosiloxane groups and hydroxyl endblocked polydiorganosiloxane having one methylvinylsiloxane unit and 1 to 5 dimethylsiloxane units for (d) organosiloxane groups. Other treating compounds and methods for treating the silica are disclosed in patent application, Ser. No. 904,048, entitled "Treatment of Reinforcing Silicas With Amidosiloxanes" by Gary R. Homan, Myron T. Maxson and Louis H. Toporcer, filed on even date herewith and assigned to the same assignee. This patent application is hereby incorporated by reference to show the amidosiloxanes, the treated silicas and the methods of preparing treated silica. Another method of treating silica using bis(polyorganosiloxanyl)amines is disclosed in patent application, Ser. No. 904,046, entitled "Bis(polyorganosiloxanyl)amines and Their Use" by Chi-Long Lee and Myron T. Maxson, filed on even date herewith and assigned to the same assignee. This patent application is hereby incorporated by reference to show the amines, the treated silica and the method of making the treated silica. Illustrations of treating silica can be found in the Examples.

The fluid organohydrogensiloxanes of (C) are well known in the art such as described by Polmanteer et al. in U.S. Pat. No. 3,697,473 and Lee et al. in U.S. Pat. No. 3,989,668 which patents are hereby incorporated by reference to show examples of organohydrogensiloxanes known in the art. The organohydrogensiloxanes useful in the present invention can be any of the methylsiloxanes having an average of at least 3 silicon-bonded hydrogen atoms per molecule and an average of no more than one silicon-bonded hydrogen atom per silicon atom. The remaining valences of the silicon atoms are satisfied by divalent oxygen atoms. The organohydrogensiloxanes can be homopolymers, copolymers, and mixtures thereof which contain dimethylsiloxane units, methylhydrogensiloxane units, dimethylhydrogensiloxy units, trimethylsiloxy units and $SiO_2$ units. Some specific examples of organohydrogensiloxanes include polymethylhydrogensiloxane cyclics, copolymers of trimethylsiloxy and methylhydrogensiloxane units, copolymers of dimethylhydrogensiloxy and methylhydrogensiloxane units, copolymers of trimethylsiloxy, dimethylsiloxane, and methylhydrogensiloxane units and copolymers of dimethylhydrogensiloxy, dimethylsiloxane, and methylhydrogensiloxne units. Preferably the organohydrogensiloxanes have an average of at least 4 silicon-bonded hydrogen atoms per molecule. The amount of organohydrogensiloxane (C) is present in amount sufficient to provide a ratio of from 1 to 3 silicon-bonded hydrogen atoms per vinyl radical in (A) and (B) combined.

The silicone elastomeric compositions can be prepared by mixing ingredients (A), (B), (C) and (D), a platinum catalyst. The platinum catalyst (D) can be any of the platinum-containing catalysts that are known to catalyze the reaction of silicon-bonded hydrogen atoms with silicon-bonded vinyl groups and which are soluble in fluid (A). Platinum-containing catalysts which are not soluble in said fluid mixture are not sufficiently effective to satisfactorily cure the compositions. A class of platinum-containing catalysts particularly suitable for use in these compositions are the complexes prepared from chloroplatinic acid as described by Willing in U.S. Pat. No. 3,419,593 which is hereby incorporated by reference to show the complexes and their preparation. One preferred catalyst of this type is a platinum-containing complex which is the reaction product of chloroplatinic acid and sym-divinyltetramethyldisiloxane.

The platinum catalyst (D) can be present in an amount sufficient to provide at least one part by weight of platinum for every one million parts by weight of fluid (A). It is preferred to use sufficient catalyst (D) so that there is present from 5 to 50 parts by weight platinum for every one million parts by weight of fluid (A). It is to be understood that amounts of platinum greater than than 50 parts per million are also effective but are unnecessary and wasteful, especially when the preferred catalyst is used.

A mixture of (A), (C), and (D) may begin to cure immediately on mixing at room temperature, therefore, it may be desirable to inhibit the action of the catalyst (D) at room temperature with a platinum catalyst inhibitor if the composition is to be stored before molding. Platinum catalyst inhibitors are used to retard the catalytic activity of the platinum at room temperature, but allow the platinum to catalyze the reaction between (A) and (C) at elevated temperature.

One suitable type of platinum catalyst inhibitor is the acetylenic inhibitors described in U.S. Pat. No. 3,445,420 to Kookootsedes et al. which is hereby incorporated by reference to show the acetylenic inhibitors and their use as inhibitors. A preferred class of acetylenic inhibitors are the acetylenic alcohols, especially 3,5-dimethyl-hexyn-3-ol.

A second type of platinum catalyst inhibitor is the olefinic siloxanes that are described in U.S. Pat. No. 3,989,667 to Lee and Marko which is hereby incorporated by reference to show the olefinic siloxanes, their preparation and their use as platinum catalyst inhibitors.

A third type of platinum catalyst inhibitor is a polymethylvinylcyclosiloxane having three to six methylvinylsiloxane units per molecule.

The amount of platinum catalyst inhibitor required is simply the amount needed to produce the desired shelf life and yet not extend the cure time of the silicone elastomeric compositions to an impractical level. The amount will vary widely and will depend upon the particular inhibitor that is used, the nature and concentration of the platinum-containing catalyst (D) and the nature of the organohydrogensiloxane (C).

Inhibitor added in amounts as small as one mole of inhibitor for every mole of platinum will in some instances cause an inhibition of the catalyst (D) and afford a satisfactory potlife. In other cases, considerably more inhibitor, such as 10, 50, 100, 500 and more moles of inhibitor for every mole of platinum may be needed to achieve the desired combination of pot life and cure time. The exact amount of any particular inhibitor to be used can be determined by simple experimentation. The effect of a platinum catalyst inhibitor can be overcome by heating the inhibited compositions to a temperature of 70° C. or higher.

The silicone elastomer compositions can also contain other ingredients such as pigments, extending fillers and thermal stability additives. These are ingredients common to the silicone elastomer art.

Compositions of the present invention can be used in a liquid injection molding process in which the composition is injected into light weight molds under low pressures, such as 600 kPa cylinder pressure. Such compositions can be cured very rapidly in a hot mold and removed without cooling the mold. The type of molding, extruding or curing process used is not narrowly critical and can include those known in the art. An advantage of the compositions of this invention is the extrudability which makes it adaptable to molding processes such as liquid injection molding at low pressures. The prepared compositions have a viscosity such that at least 45 grams per minute can be extruded through a 3.175 millimeter orifice under a pressure of 620 kilopascals. Preferably, the viscosity is such that at least 50 grams per minute can be extruded.

The silicone elastomeric compositions can readily be prepared in conventional mixing equipment because of its fluid nature. The order of mixing is not critical if the composition is to be used immediately. However, it is preferable to combine (A), (B) and (D) and thereafter add (C). This permits the small amount of (D) to become well dispersed in (A) and (B) prior to the beginning of any curing reaction. Suitable two package composition can be made using such a technique. For example, a convenient two package composition can be prepared by mixing part of (A), part of (B) and all of (D) in one package and the remainder of (A) and (B) and all of (C) in a second package such that equal weight amounts of package one and package two can be mixed to produce the compositions of this invention. Single package compositions can be prepared by mixing (A), (B), (C), (D) and a platinum catalyst inhibitor. These inhibited compositions can be stored for extended periods of time without curing, but the compositions will still cure when heated above 70° C., preferably when heated above 100° C. to shorten the cure time.

It is advised that a mixture of (A), (C) and (D) will immediately begin to cure at room temperature. This consideration should be taken into account when preparing and using compositions of this invention. Although the silicone elastomeric compositions of this invention will cure at room temperature, it is best to use inhibited compositions for molding or extruding processes to avoid scorching during material transfer, especially where the composition may come in contact with warm surfaces.

The cured silicone elastomers obtained from the compositions have properties which are improved. Although individual properties may be substantially improved, it is the total property profile which is unique to these compositions. Such property profiles are not expected from compositions which are as extrudable as those of this invention. The properties of the cured silicone elastomer in this profile which provide the unique character are the durometer, tensile strength, elongation, and tear strength.

The following examples are presented for illustrative purposes and should not be construed as limiting the invention wich is properly delineated in the claims. All parts in the following examples are parts by weight unless otherwise specified.

EXAMPLE 1

A. A silicone elastomeric composition was prepared by mixing by hand stirring 100 parts of a methylphenylvinylsiloxy endblocked polydimethylsiloxane fluid (hereinafter identified as Fluid A), 0.24 part of a chloroplatinic acid complex of symmetrical tetramethyldivinyldisiloxane diluted with methylphenylvinylsiloxy endblocked polydimethylsiloxane to provide a platinum catalyst having about 0.7 weight percent platinum, 0.1 part of 3,5-dimethyl-1-hexyn-3-ol, 1.44 part of a trimethylsiloxy endblocked polyorganosiloxane (hereinafter identified as Crosslinker A) having an average of five methylhydrogensiloxane units and three dimethylsiloxane units and then 40 parts of a treated fume silica (Silica A). The resulting composition was further mixed by giving it three passes on a three roll mill to disperse the filler. The mixture was then deaired and yielded an easily extrudable material with a paste-like consistency.

Fluid A had a major PM of about 104,000, a minor PM of about 12,000 a DI of about 7.2, the lowest molecular weight species had a molecular weight of about 1,200 and the highest molecular weight species had a molecular weight of about 370,000.

Silica A was prepared by placing 543 g. of a fume silica having a surface area of about 400 square meters per gram and which had been dried for 22 hours at 200° C. into a flask equipped with a stirrer and addition funnel. To the flask, there was added enough dry toluene to cover the silica. The flask contents were then stirred forming a slurry. To the stirring slurry, 27.1 g. of water was added. A mixture of 5.43 g. of symmetrical-tetramethyldivinyldisilazane and 103.1 g. of hexamethyldisilazane was then slowly added to the stirring slurry. The slurry was then stirred for 48 hours. The resulting slurry was poured into open glass containers which allowed the toluene to evaporate. The resulting residue was then heated for 8 hours at 150° C. in an air circulating oven to remove additional toluene and any other volatiles. The residue was Silica A.

B. A silicone elastomeric composition was prepared as described in A. using the same ingredients and amounts, except a treated silica which contained no vinyl radical was used. This treated silica was prepared in a closed container by mixing 100 parts of a fume silica having a surface area of about 250 square meters per gram, 5 parts of water and 20 parts of hexamethyldisilazane. The resulting mixture was agitated for 4 hours and then heated for 4 hours at 140° C. under reduced pressure to remove any volatiles. This silicone elastomeric composition is presented for comparative purposes, and is not within the scope of this invention.

C. A silicone elastomeric composition was prepared as described in A. using the same ingredients and amounts, except in place of Fluid A a fluid was used which had a PM of about 104,000, a DI of about 3.0, the lowest molecular weight species had a molecular weight about 1,200 and the highest molecular weight species had a molecular weight about 370,000. This silicone elastomeric composition was too stiff to be easily extruded.

The three above defined silicone elastomeric compositions were cured by pressing and curing for 15 minutes at 175° C. and then post cured by heating at 150° C. for 16 hours. The physical properties of the resulting cured sheets were determined by ASTM-412 for tensile strength an elongation, ASTM-D625, Die B, for tear strength and ASTM-D2240 for durometer, Shore A scale. The 100% modulus was determined by measuring the tensile stress at 100% strain. The measured physical properties were as shown in Table I in which the tensile strength and 100% modulus are recorded in megapascals (MPa) and the tear strength is recorded in kilonewtons per meter.

TABLE I

| Physical property | Composition | | |
| --- | --- | --- | --- |
| | A | B | C |
| Durometer | 65 | 38 | 45 |
| Tensile Strength, MPa | 6.97 | 7.53 | 6.89 |
| Elongation, % | 454 | 838 | 680 |
| 100% Modulus, MPa | 2.65 | 0.60 | 0.76 |
| Tear Strength, kN/m | 35.0 | 32.9 | 35.0 |

EXAMPLE 2

A. A silicone elastomeric base was prepared by mixing in a dough type mixer, 150 g. of methylphenylvinylsiloxy endblocked polydimethylsiloxane fluid (Fluid B) and 6 g. of water. After a mixing period of 5 minutes, a mixture of 24.67 g. of hexamethyldisilazane and 1.68 g. of symmetrical-tetramethyldivinyldisilazane was added and then the mixing was continued for 5 minutes. To this mixture, 40 g. of a fume silica with a surface area of about 400 square meters per gram was slowly added. The mixer was blanketed with nitrogen and the mixing was continued for another 15 minutes. Two additional 40 g. additions of the silica were added at 15 minute intervals. The resulting mixture was mixed for 30 minutes and then heated to 175° C. for one hour with continued mixing and at a reduced pressure to remove volatiles. To the resulting hot mixture, 150 g. of Fluid B was added and heated at reduced pressure for another 30 minutes. The mixture was cooled under reduced pressure to yield a silicone elastomeric base containing an in situ treated silica. This base extruded through a 3.175 millimeter orifice under a pressure of 620 kilopascals (kPa) at the rate of 58 grams per minute. Fluid B had a major PM of 104,445 and a minor PM of 12,688, a DI of 11.9, the lowest molecular weight species had a molecular weight of 1194, and the highest molecular weight species had a molecular weight of 370,000.

A silicone elastomeric composition was prepared by mixing 100 g. of the above silicone elastomeric base and 2.21 g. of a mixture which provided a ratio of 1.75 silicon-bonded hydrogen atoms to one vinyl radical, said mixture being made from 90 parts of Crosslinker A and 10 parts of a trimethylsiloxy endblocked polymethylhydrogensiloxane having about 1.6 weight percent silicon-bonded hydrogen atoms, 0.19 g. of the platinum catalyst defined in Example 1 and 4 drops of 3,5-dimethyl-1-hexyn-3-ol. This silicone elastomeric composition was cured and tested as described in Example 1. The cured elastomer had a durometer of 56 on the Shore A scale, a tensile strength of 8.68 MPa, an elongation of 377%, a 100% modulus of 2.78 MPa, and a tear strength of 44.3 kN/m.

B. A silicone elastomeric base was prepared as described in A. using the same ingredients and amounts except that in place of Fluid B, the fluid was used as described in Example 1, C. which had a PM of about 104,000 and a DI of about 3.0. A silicone elastomeric composition was prepared as described in A. above except that 1.34 parts of the mixture containing Crosslinker A was used in place of the 2.21 parts. The silicone elastomeric composition was cured and tested as described in Example 1. The cured elastomer had a durometer of 39 on the Shore A scale, a tensile strength of 10.39 MPa, an elongation of 596%, a 100% modulus of 0.85 MPa and a tear strength of 48.6 kN/m. This composition is present for comparative purposes.

EXAMPLE 3

A. A silicone elastomeric base was prepared by the in situ procedure described in Example 2, A. The ingredients and amounts used were:

50 parts of a methylphenylvinylsiloxy endblocked polydimethylsiloxane (Fluid C) fluid having a PM of 104,445, a DI of 9.23, the lowest molecular weight species having a molecular weight of 2910 and the highest molecular weight species having a molecular weight of 370,000,
1.75 parts of water,
6.88 parts of hexamethyldisilazane,
0.79 part of symmetrical-tetramethyldivinyldisilazane,
11.7 parts of a fume silica having a surface area of about 250 square meters per gram, (this amount was added three times), and
50 parts of Fluid C.

The extrusion rate was determined as described in Example 2 for the resulting silicone elastomeric base. A silicone elastomeric composition was prepared by mixing 100 parts of silicone elastomeric base and 2.34 parts of Crosslinker A which provided a ratio of 1.75 silicon-bonded hydrogen atoms per vinyl radical. The silicone elastomeric composition was cured and tested as described in Example 1. The results were as shown in Table II.

B. A silicone elastomeric base and composition were prepared as described in A., except Fluid C was replaced by a methylphenylvinylsiloxy endblocked polydimethylsiloxane fluid having a PM of 88,693, a DI of 9.84, the lowest molecular weight species having a molecular weight of 841 and the highest molecular weight species having a molecular weight of 252,000. The silicone elastomeric composition was prepared using 2.80 parts by weight Crosslinker A otherwise the ingredients and amounts were the same as described in A. The siicone elastomeric composition was cured and tested as described in Example 1. The results were as shown in Table II.

C. The silicone elastomeric composition as prepared in B. was repeated. The results were as described in Table II.

D. A silicone elastomeric composition was prepared by the method and with the ingredients and amounts as described in A. except Crosslinker A was used in an amount of 2.21 in place of the 2.34 used in A. and Fluid C was replaced with a methylphenylvinylsiloxy endblocked polydimethylsiloxane having a PM of 146,622, a DI of 6.43, the lowest molecular weight species had a molecular weight of 2608, and the highest molecular weight species had a molecular weight of 304,805. This is presented for comparative purposes. The results were as described in Table II.

TABLE II

| Property | A. | B. | C. | D. | E. |
|---|---|---|---|---|---|
| Durometer, Shore A | 37 | 45 | 46 | 35 | 58 |
| Tensile Strength, MPa | 9.22 | 9.50 | 9.19 | 9.80 | 5.02 |
| Elongation, % | 530 | 503 | 460 | 665 | 119 |
| Tear Strength, kN/m | 25.2 | 32.9 | 29.2 | 19.4 | 3.3 |
| Extrusion Rate, g./min. | 48 | 106 | 92 | 27 | 528 |

E. A silicone elastomeric composition was prepared as described in A. except the ingredients and amounts were:

100 parts of a methylphenylvinylsiloxy endblocked polydimethylsiloxane having a PM of about 16,200, a DI of about 3.0, the lowest molecular weight species having a molecular weight of 1700 and the highest molecular weight species having a molecular weight of about 55,000,
2.25 parts of water,
45 parts of fume silica having a surface area of about 400 square meters per gram,
9.24 parts of hexamethyldisilazane,
0.63 part of symmetrical-tetramethyldivinyldisilazane, and
3.8 parts of Crosslinker A.

The results were as shown in Table II. This silicone elastomeric composition was prepared for comparative purposes.

EXAMPLE 4

A. A silicone elastomeric composition was prepared as described in Example 2, A. using the same ingredients and amounts except 1.64 g. of the compound of the formula

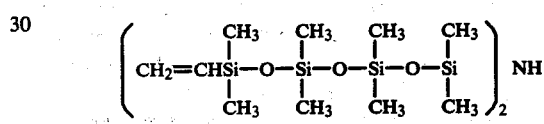

was substituted for 1.68 g. of symmetrical-tetramethyldivinyldisilazane. The results were as shown in Table III.

B. A silicone elastomeric composition was prepared as described in Example 2, A. using the same ingredients and amounts, except 0.76 g. of a material of the formula

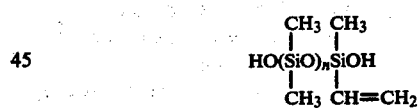

where n had an average in the range of 1 to 5, was substituted for 1.68 g. of symmetrical-tetramethyldivinyldisilazane. The results were as shown in Table III.

TABLE III

| | Composition | |
|---|---|---|
| Property | A | B |
| Durometer, Shore A | 62 | 56 |
| Tensile Strength, MPa | 9.07 | 9.23 |
| Elongation, % | 406 | 475 |
| 100% Modulus, MPa | 2.92 | 2.34 |
| Tear Strength, kN/m | 38.7 | 31.2 |
| Extrusion Rate, g./min. | 80 | 61 |

EXAMPLE 5

A. A silicone elastomeric composition was prepared as described in Example 3, A. using the ingredients and amounts as follows:

100 parts of a methylphenylvinylsiloxy end-blocked polydimethylsiloxane fluid having a major PM of 104,445, a minor PM of 9,993, a DI of 8.75, the lowest molecular weight species had a molecular weight of 946, and the highest molecular weight species had a molecular weight of 304,000,
2.0 parts of water,
40 parts of fume silica having a surface area of 400 square meters per gram,
1.67 parts of symmetrical-tetramethyldivinyldisilazane,
7.2 parts of hexamethyldisilazane, and
3.39 parts of the organohydrogensiloxane mixture described in Example 2, A.

This silicone elastomeric composition had a ratio of 5 moles of trimethylsiloxy groups to one mole of dimethylvinylsiloxy group, and had 1.25 silicon-bonded hydrogen atoms per one vinyl radical. The results were as shown in Table IV. This silicone elastomeric composition was prepared for comparative purposes.

B. A silicone elastomeric composition was prepared as described in A. using the same ingredients and amounts except the fluid of A. was substituted with a methylphenylvinylsiloxy endblocked polydimethylsiloxane fluid having a major PM of 104,445, a minor PM of 9,993, a DI of 8.91, the lowest molecular weight species had a molecular weight of 1,498 and the highest molecular weight species had a molecular weight of 304,000, 8.21 parts of hexamethyldisilazane was used instead of 7.2 parts, 0.56 part of symmetrical-tetramethyldivinyldisilazane was used instead of 1.67 parts and 3.37 parts of the organohydrogensiloxane mixture was used instead of 3.39 parts. The results were as shown in Table IV. This silicone elastomeric composition had 20 moles of trimethylsiloxy groups to one mole of dimethylvinylsiloxy group, and had two silicon-bonded hydrogen atoms per vinyl radical.

C. A silicone elastomeric composition was prepared as described in A. using the same ingredients and amounts except Fluid A was used in place of the fluid described in A., 8.0 parts of hexamethyldisilazane was used in place of 7.2 parts, 0.8 part of symmetrical-tetramethyldivinyldisilazane was used in place of the 1.67 parts, and 1.7 parts of Crosslinker A. The silica filler contained 0.05 weight percent vinyl radical and the total vinyl radical in the silicone elastomer composition was 0.23 weight percent. The results were as shown in Table IV.

D. A silicone elastomeric composition was prepared as described in Example 1, A. The results were as shown in Table IV.

E. A silicone elastomeric composition was prepared as described in Example 1, A., except 30 parts of Silica A was used in place of the 40 parts. The results were as shown in Table IV.

TABLE IV

| Property | Composition | | | | |
|---|---|---|---|---|---|
| | A | B | C | D | E |
| Durometer, Shore A | 68 | 60 | 53 | 59 | 49 |
| Tensile Strength, MPa | 6.85 | 8.94 | 9.80 | 8.33 | 5.42 |
| Elongation, % | 161 | 291 | 410 | 525 | 512 |
| 100% Modulus, MPa | 4.82 | 3.40 | 2.31 | — | — |
| Tear Strength, kN/m | 5.08 | 35.0 | 35.0 | 36.0 | 31.5 |
| Extrusion rate, g./min. | 89 | 96 | — | 62 | 147 |

That which is claimed is:

1. A silicone elastomeric composition consisting essentially of a product obtained by mixing
   (A) 100 parts by weight of a triorganosiloxy end-blocked polydimethylsiloxane fluid in which the triorganosiloxy units are selected from the group consisting of dimethylvinylsiloxy and methylphenylvinylsiloxy, said fluid being a mixture of polymeric species of varying molecular weight where each species is present in an amount sufficient to collectively provide a molecular weight distribution such that there is present at least one polymeric species (1) at a concentration greater than the concentrations of adjacent polymeric species of lower and higher molecular weight where polymeric species (1) is identified as a peak molecular weight as determined by gel permeation chromatographic analysis and there being a peak molecular weight of polymeric species in the range of from 68,000 to 135,000 at a major concentration, in said fluid the molecular weight of the lowest molecular weight polymeric species being in the range of from 854 to 3146 and the molecular weight of the highest molecular weight species being in the range of from 174,000 to 370,000, the mixture of polymeric species having a molecular weight distribution such that a dispersity index has a value greater than 3.8,
   (B) from 20 to 60 parts by weight of a reinforcing amorphous silica having a surface area of greater than 100 square meters per gram, the surface of the silica having silicon atoms to which are bonded organosiloxane groups selected from the group consisting of
   (a) (CH$_3$)$_3$SiO—,
   (b) CH$_2$=CH(CH$_3$)$_2$SiO{(CH$_3$)$_2$SiO}$_x$—,
   (c) CH$_2$=CH(CH$_3$)(C$_6$H$_5$)SiO{(CH$_3$)$_2$SiO}$_x$—, and

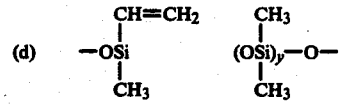

in which x is an integer of 0 to 20 and y is an integer of 1 to 5, the organosiloxane groups being present in an amount such that there is from 0.05 to 0.32 percent by weight vinyl based on the weight of the silica and the organosiloxane groups being present in a mole ratio such that there is from 7 to 50 moles of (a) for each mole of (b), (c), (d) or mixtures thereof,
   (C) an amount of a fluid organohydrogensiloxane sufficient to provide from 1 to 3 inclusive silicon-bonded hydrogen atoms per vinyl radical in (A) and (B) combined, said organohydrogensilxoane having an average of at least three silicon-bonded hydrogen atoms per molecule and consisting essentially of units selected from a group consisting of methylhydrogensiloxane, dimethylsiloxane, dimethylhydrogensiloxy, trimethylsiloxy and SiO$_2$ units, and
   (D) an amount of a platinum catalyst sufficient to provide at least one part by weight platinum per one million parts by weight of (A), said platinum catalyst being soluble in (A), the silicone elastomer composition having a viscosity such that at least 45 grams per minute of the composition can be extruded through a 3.175 millimeter orifice under a pressure of 620 kilopascals.

2. The silicone elastomeric composition according to claim 1 in which the triorganosiloxy endblocked polydimethylsiloxane fluid of (A) has a peak molecular weight in the range of 80,000 to 120,000 at a major concentration and a dispersity index in the range of 6 to 12.

3. The silicone elastomeric composition according to claim 1 in which the triorganosiloxy endblocked polydimethylsiloxane fluid of (A) contains two peak molecular weights where the peak molecular weight in the range of from 68,000 to 135,000 being at a major concentration and another peak molecular weight in the range of from 4,000 to 24,100 being at a minor concentration.

4. The silicone elastomeric composition according to claim 1 in which the triorganosiloxy unit of (A) is methylphenylvinylsiloxy and the silica of (B) has a surface area of 120 to 600 square meters per gram, the organosiloxane groups are (a) and (b) where x has a value of 0 to 5 inclusive, and the silica is present in an amount of from 35 to 45 parts by weight.

5. The silicone elastomeric composition according to claim 2 in which the triorganosiloxy of (A) is methylphenylvinylsiloxy and the silica of (B) has a surface area of 120 to 600 square meters per gram, the organosiloxane groups are (a) and (b) where x has a value of 0 to 5 inclusive, and the silica is present in an amount of from 35 to 45 parts by weight.

6. The silicone elastomeric composition according to claim 1 in which the triorganosiloxy of (A) is methylphenylvinylsiloxy and the silica of (B) has a surface area of 120 to 600 square meters per gram, the organosiloxane groups are (a) and (d) where y has a value of 1 to 5 inclusive, and the silica is present in an amount of from 35 to 45 parts by weight.

7. The silicone elastomeric composition according to claim 2 in which the triorganosiloxy of (A) is methylphenylvinylsiloxy and the silica of (B) has a surface area of 120 to 600 square meters per gram, the organosiloxane groups are (a) and (d) where y has a value of 1 to 5 inclusive, and the silica is present in an amount of from 35 to 45 parts by weight.

8. The silicone elastomeric composition according to claim 3 in which the triorganosiloxy unit of (A) is methylphenylvinylsiloxy and the silica of (B) has a surface area of 120 to 600 square meters per gram, the organosiloxane groups are (a) and (b) where x has a value of 0 to 5 inclusive, and the silica is present in an amount of from 35 to 45 parts by weight.

9. The silicone elastomeric composition according to claim 3 in which the triorganosiloxy unit of (A) is methylphenylvinylsiloxy and the silica of (B) has a surface area of 120 to 600 square meters per gram, the organosiloxane groups are (a) and (d) where y has a value of 1 to 5 inclusive and the silica is present in an amount of from 35 to 45 parts by weight.

10. The silicone elastomeric composition according to claim 3 in which the peak molecular weight at the major concentration is in the range of 80,000 to 120,000 and the peak molecular weight at the minor concentration is in the range of 7,000 to 15,000.

11. The silicone elastomeric composition according to claim 8 in which the peak molecular weight at the major concentration is in the range of 80,000 to 120,000 and the peak molecular weight at the minor concentration is in the range of 7,000 to 15,000.

12. The silicone elastomeric composition according to claim 9 in which the peak molecular weight at the major concentration is in the range of 80,000 to 120,000 and the peak molecular weight at the minor concentration is in the range of 7,000 to 15,000.

13. The silicone elastomeric composition according to claim 1 in which there is also present an amount of a platinum catalyst inhibitor sufficient to extend the shelf life at ambient temperature.

14. The silicone elastomeric composition according to claim 13 in which the platinum catalyst inhibitor is an acetylenic alcohol.

15. The silicone elastomer composition according to claim 14 in which the acetylenic alcohol is 3,5-dimethyl-1-hexyn-3-ol.

16. The silicone elastomeric composition according to claim 7 in which there is also present an amount of a platinum catalyst inhibitor sufficient to extend the shelf life at ambient temperature.

17. The silicone elastomeric composition according to claim 16 in which the platinum catalyst inhibitor is an acetylenic alcohol.

18. The silicone elastomeric composition according to claim 17 in which the acetylenic alcohol is 3,5-dimethyl-1-hexyn-3-ol.

19. The silicone elastomeric composition according to claim 11 in which there is also present a platinum catalyst inhibitor sufficient to extend the shelf life at ambient temperature.

20. The silicone elastomeric composition according to claim 19 in which the platinum catalyst inhibitor is an acetylenic alcohol.

21. The silicone elastomeric composition according to claim 20 in which the acetylenic alcohol is 3,5-dimethyl-1-hexyn-3-ol.

* * * * *